United States Patent
Brown et al.

(10) Patent No.: US 9,542,107 B2
(45) Date of Patent: Jan. 10, 2017

(54) FLASH COPY RELATIONSHIP MANAGEMENT

(71) Applicant: International Business Machines Corporation, Armonk, NY (US)

(72) Inventors: Theresa M. Brown, Tucson, AZ (US); Nedlaya Y. Francisco, Tuscon, AZ (US); Suguang Li, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 14/314,203

(22) Filed: Jun. 25, 2014

(65) Prior Publication Data

US 2015/0378620 A1    Dec. 31, 2015

(51) Int. Cl.
*G06F 12/00* (2006.01)
*G06F 3/06* (2006.01)

(52) U.S. Cl.
CPC ............ *G06F 3/0619* (2013.01); *G06F 3/061* (2013.01); *G06F 3/0659* (2013.01); *G06F 3/0689* (2013.01)

(58) Field of Classification Search
CPC ..... G06F 3/0619; G06F 3/0647; G06F 3/0689
See application file for complete search history.

(56) References Cited

U.S. PATENT DOCUMENTS

| | | | |
|---|---|---|---|
| 7,647,456 B2 | 1/2010 | Wolfgang et al. | |
| 7,669,024 B2 | 2/2010 | Fuente | |
| 2005/0044289 A1* | 2/2005 | Hendel | G06F 3/0613 710/33 |
| 2006/0069888 A1 | 3/2006 | Martinez | |
| 2006/0294228 A1* | 12/2006 | Almstrom | G06Q 40/04 709/224 |
| 2007/0033361 A1 | 2/2007 | Abdulvahid et al. | |
| 2010/0250651 A1* | 9/2010 | Bi | G06F 15/167 709/203 |

(Continued)

OTHER PUBLICATIONS

IBM, "Method for Determining Storage Device Background Copy Weight," An IP.com Prior Art Database Technical Disclosure, Nov. 17, 2006, IP.com No. IPCOM000143261D.

(Continued)

*Primary Examiner* — Charles Rones
*Assistant Examiner* — Nanci Wong
(74) *Attorney, Agent, or Firm* — Nicholas D. Bowman

(57) ABSTRACT

A method for combining storage array copy requests for a disk storage system is disclosed. The method may include receiving a BGC (background copy) request, determining that the BGC request satisfies a set of background copy (BGC) criteria, and adding, based on the determining, the BGC request to a sorted position in the wait accumulation queue (WAQ). The method may also include combining, based on a set of track combining criteria, the BGC request and an adjacent BGC request into a combined BGC request including data locations corresponding to the BGC request and to the adjacent BGC request. The method may also include replacing, in a sorted position in the WAQ, the BGC request and the adjacent BGC request with the combined BGC request, and moving, based on the set of BGC criteria, the combined BGC request to a BGC queue.

17 Claims, 11 Drawing Sheets

(56) References Cited

U.S. PATENT DOCUMENTS

| | | | |
|---|---|---|---|
| 2012/0198150 A1* | 8/2012 | Benhase | G06F 3/0617 |
| | | | 711/114 |
| 2012/0239893 A1 | 9/2012 | Jennas, II et al. | |
| 2013/0219142 A1 | 8/2013 | Benhase, Jr. et al. | |
| 2013/0246427 A1 | 9/2013 | Murata et al. | |
| 2013/0318317 A1 | 11/2013 | Blea et al. | |
| 2014/0365598 A1* | 12/2014 | Torpey | G06F 3/061 |
| | | | 709/213 |
| 2015/0046605 A1* | 2/2015 | Barrell | G06F 3/0659 |
| | | | 710/5 |

OTHER PUBLICATIONS

Mell et al., "The NIST Definition of Cloud Computing," National Institute of Standards and Technology, U.S. Department of Commerce, Special Publication 800-145, Sep. 2011.

* cited by examiner

Write Relationship Request Combining

302 WAQ Before Request Combining

| | Vol | | Source Trk | | Target Trk | | WAQ Tstamp | Ext Size | # Rel Comb |
|---|---|---|---|---|---|---|---|---|---|
| | Src | Tgt | 1st | Lst | 1st | Lst | | | |
| 1A— | A | B | - | - | - | - | - | - | - |
| 2A— | A | B | - | - | - | - | - | - | - |
| 3A— | A | C | 56 | 63 | 456 | 463 | - | - | - |
| 4A— | A | C | 160 | 187 | 260 | 287 | 10 | 28 | 1 |
| 5A— | A | C | 188 | 215 | 288 | 315 | 25 | 28 | 1 |
| 6A— | A | C | 216 | 243 | 316 | 343 | 30 | 28 | 1 |
| 7A— | A | D | - | - | - | - | - | - | - |
| 8A— | A | D | - | - | - | - | - | - | - |
| 9A— | A | E | - | - | - | - | - | - | - |
| 10A— | A | E | - | - | - | - | - | - | - |
| 11A— | A | F | - | - | - | - | - | - | - |

304 WAQ After Request Combining

| | Vol | | Source Trk | | Target Trk | | WAQ Tstamp | Ext Size | # Rel Comb |
|---|---|---|---|---|---|---|---|---|---|
| | Src | Tgt | 1st | Lst | 1st | Lst | | | |
| 1B— | A | B | - | - | - | - | - | - | - |
| 2B— | A | B | - | - | - | - | - | - | - |
| 3B— | A | C | 56 | 63 | 456 | 463 | - | - | - |
| 4B— | A | C | 160 | 243 | 260 | 343 | 10 | 84 | 3 |
| 7B— | A | D | - | - | - | - | - | - | - |
| 8B— | A | D | - | - | - | - | - | - | - |
| 9B— | A | E | - | - | - | - | - | - | - |
| 10B— | A | E | - | - | - | - | - | - | - |
| 11B— | A | F | - | - | - | - | - | - | - |
| 12B— | - | - | - | - | - | - | - | - | - |
| 13B— | - | - | - | - | - | - | - | - | - |

FIG. 3

FLASH COPY RELATIONSHIP MANAGEMENT

BACKGROUND

The present disclosure generally relates to virtual machine (VM) storage arrays. In particular, this disclosure relates to performing write operations to VM storage arrays by combining accelerated copy requests.

A virtual machine (VM) may be a software implementation of a computing machine (i.e., a computer) that executes program instructions in a manner similar to a physical computing machine. A certain type of virtual machine may emulate an entire system platform which may support the execution of a complete operating system (OS) (e.g., WINDOWS or LINUX). Another type of virtual machine may emulate a single operating system process, which may be useful for running a single program. Software running on a VM may be limited to the resources and abstractions provided by the virtual machine, and may not operate outside of its virtual (limited) environment. Limiting a software application's accessibility to resources to may be useful in protecting certain computing resources (e.g., memory, disk storage) which may be shared with other applications, programs or VMs, from software errors and security-related issues. Current use of virtual machines may include implementations which may have no direct correspondence to any physical machine hardware implementations.

A Redundant Array of Independent Disks, known as "RAID", may be a data storage virtualization technology that combines multiple disk drive components into a logical unit for the purposes of data redundancy and performance improvement. Data stored in RAID systems may be distributed across multiple drives in one of several ways, referred to as "RAID levels", depending on a specific level of redundancy and performance required. The different schemes or architectures may be named by the word RAID followed by a number (e.g. "RAID 0", "RAID 1"). Each scheme may provide a different level of balance between the goals of reliability and availability, performance and capacity. RAID levels greater than RAID 0 may provide protection against unrecoverable (sector) read errors, as well as whole disk failure.

SUMMARY

Various aspects of the present disclosure may be useful for increasing the efficiency and bandwidth of, and reducing latency involved in data copy operations in a VM storage array. A background copy (BGC) combining system configured according to embodiments of the present disclosure may increase the overall performance of a VM storage array, while providing the VM storage array with the ability to dynamically adapt to changing storage workloads.

Embodiments may be directed towards a method for combining storage array copy requests for a disk storage system. The method may include receiving a first BGC (background copy) request, determining that the first BGC request satisfies a set of background copy (BGC) criteria, and adding, based on the determining, the first BGC request to a sorted position in the wait accumulation queue (WAQ). The method may also include combining, based on comparing a set of track combining data to a set of track combining criteria, the first BGC request and a first adjacent BGC request into a second BGC request, the second BGC request including data locations corresponding to the first BGC request and data locations corresponding to the first adjacent BGC request. The method may also include replacing, in a sorted position in the WAQ, the first BGC request and the first adjacent BGC request with the second BGC request and moving, based on the set of BGC criteria, the second BGC request to a BGC queue.

Embodiments may also be directed towards an electronic system for combining storage array copy requests for a disk storage system. The electronic system may include a multi-volume disk storage system, a control unit adapter, a memory device and one or more processor circuits. The processor circuits may be configured to receive a first BGC (background copy) request, determine that the first BGC request satisfies a set of background copy (BGC) criteria and add, based on the determining, the first BGC request to a sorted position in the WAQ. The processor circuits may also be configured to combine, based on comparing a set of track combining data to a set of track combining criteria, the first BGC request and a first adjacent BGC request into a second BGC request, the second BGC request including data locations corresponding to the first BGC request and data locations corresponding to the first adjacent BGC request. The processor circuits may also be configured to replace, in a sorted position in the WAQ, the first BGC request and the first adjacent BGC request with the second BGC request and move, based on the set of BGC criteria, the second BGC request to a BGC queue.

Embodiments may also be directed towards a computer program product for combining storage array copy requests for a disk storage system. The computer program product may include a computer readable storage medium having program instructions stored upon it that are executable by one or more processor circuits. The program instructions may cause the device to receive a first BGC (background copy) request, determine that the first BGC request satisfies a set of background copy (BGC) criteria and add, based on the determining, the first BGC request to a sorted position in the WAQ. The program instructions may also cause the device to combine, based on comparing a set of track combining data to a set of track combining criteria, the first BGC request and a first adjacent BGC request into a second BGC request, the second BGC request including data locations corresponding to the first BGC request and data locations corresponding to the first adjacent BGC request. The program instructions may also cause the device to replace, in a sorted position in the WAQ, the first BGC request and the first adjacent BGC request with the second BGC request and move, based on the set of BGC criteria, the second BGC request to a BGC queue.

Aspects of the various embodiments may be used to combine multiple BGC requests to create larger (possibly "full stride") copy requests which may make efficient use of VM storage array software, disk, and control unit adapter resources. Aspects of the various embodiments may also be useful for limiting a number of concurrent BGC requests in the BGC queue of a VM storage array, by using existing and proven software design and implementation practices, and storage array technologies.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 is a diagram depicting write relationship requests combining, according to embodiments.

Figure 1:
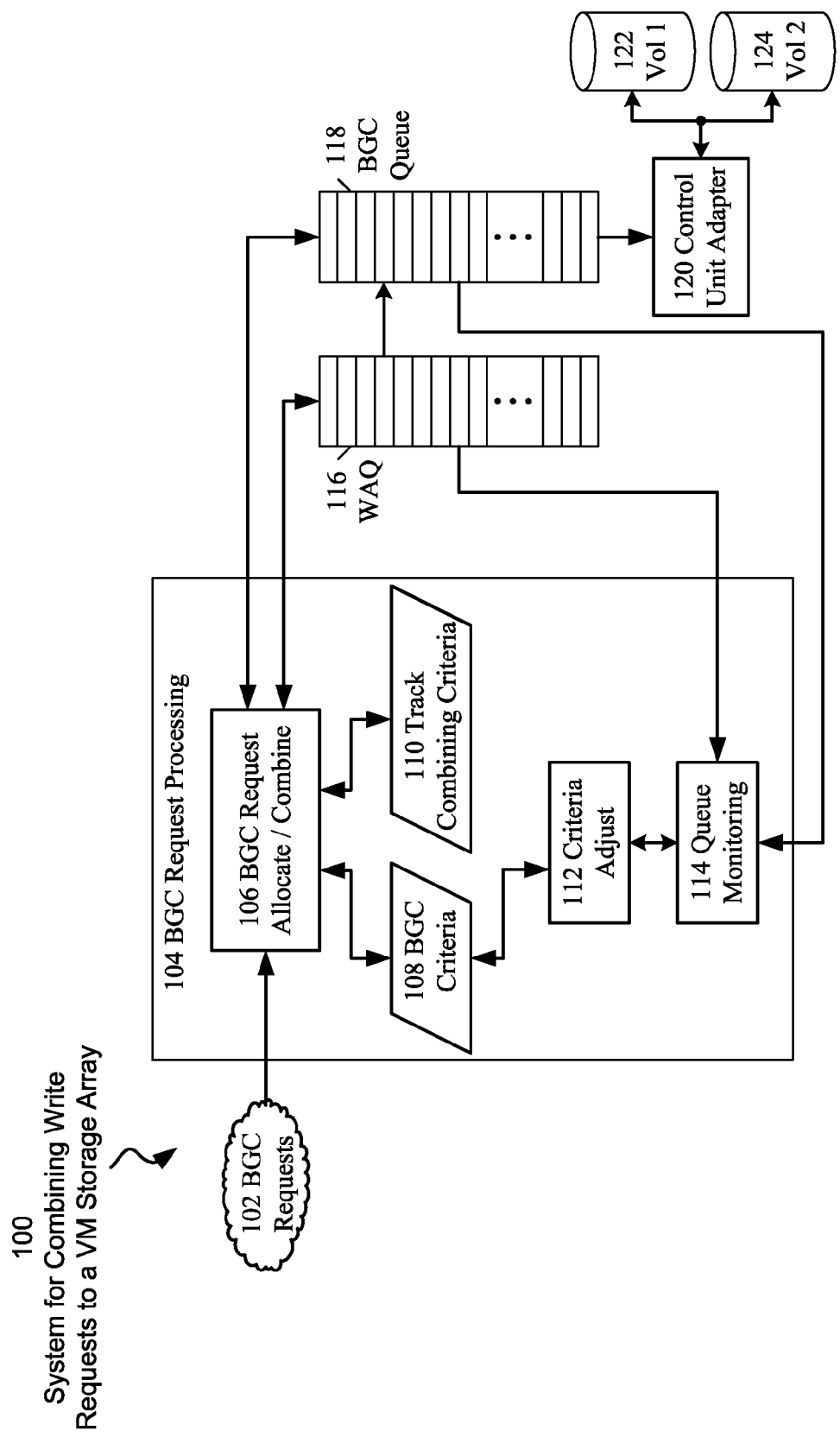
FIG. 1 is a block diagram depiction of a system for combining BGC requests to a VM storage array, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing combining of accelerated copy requests for data storage devices. Such data storage devices may include virtual machine (VM) storage arrays, which may be used to provide data storage capability to virtual machines. Such VM storage arrays may include arrays incorporated into a computer system hosting one or more VMs, or arrays attached or networked to such computer systems. VM storage array systems may include storage technologies such as magnetic disks, Redundant Array of Independent Disks (RAID) arrays, flash memory, and a variety of caching schemes. Embodiments of the present disclosure may be useful for increasing efficiency of data storage operations related to local, distributed and cloud-based applications such as transaction processing, data analytics and reporting, and enterprise software applications. While not necessarily limited thereto, embodiments discussed in this context can facilitate an understanding of various aspects of the disclosure.

For ease of discussion, the term "background copy" (BGC) is used herein, however, it is understood that in various embodiments the terms "write requests" or "relationship requests" may also refer to data write/copy relationship requests.

Virtualization software (e.g., VMWARE®), running on a virtual machine (VM) may use an application programming interface (API) framework, such as VSTORAGE API for Array Integration (VAAI®), to offload certain storage tasks from server virtualization hardware to a VM storage array. An API framework may use a low-level copy routine such as XCOPY® to perform accelerated copies of data from one storage volume or LUN (logical unit number) to another volume. Virtualization software may use a relatively small copy size, for example 4 MB, and each low-level copy routine command may correspondingly copy 4 MB from one volume to another volume in sequential batches of 8 copies. The virtualization software may continue to issue low-level copy routine commands until an entire data copy operation has completed.

On particular types of VM storage arrays (e.g., IBM® DS8000), each low-level copy routine (e.g., XCOPY®) command may invoke a "point in time" volume copy (e.g., FLASHCOPY®) feature to perform the physical copy operation (relationship) of 4 MB or 64 disk tracks. Point in time copies may be useful in preventing data version skew and corresponding data corruption by providing nearly instantaneous copying of data. By way of example, when a low-level copy routine such as XCOPY® and a point in time copy feature (e.g., FLASHCOPY®) are used to copy 1 TB of data, approximately 262,144 copy relationships may be created.

A large number of (concurrent) copy relationships may exceed a volume (LUN) point in time copy relationship limit of 64,000, which may prevent new point in time copy relationships from being subsequently established, until the number of copy relationships becomes less than a point in time copy relationship limit. If new point in time copy relationships cannot be established, then the virtualization software (e.g., VMWARE®) may reallocate a copy function to READ/WRITE commands, which may be slower than using point in time copy relationships.

A VM storage array may include a striped RAID structure, and may store data on corresponding stripes of multiple disk drives within the array. For example, a RAID array may include 6 or 7 disk drives for data and one for parity resulting in a "6+P" or "7+P" configuration, respectively. Data parity calculations (prior to data write operations) may include data on all disks of a particular data stripe (within stride boundaries). For example, in a "6+P" configuration, data from stripes on 6 (data) disk drives may be used to calculate a parity value, which may be written to the $7^{th}$ ("P") drive. A "full stride" write may include writing data to a stripe of each of the data disks and the corresponding parity disk within the array.

If a write operation does not include data (and parity) from all of the stripes including all disks of the array, then the missing data stripes may be retrieved from the array, and combined with the (pending) data to be written, before parity can be calculated. Extra read and write operations involved in retrieving data and parity may impose a "parity regeneration penalty", and may make the write operation to the array less efficient than a "full stride" write. In general, for reasons described, as well as increased control unit overhead associated with relatively small data write operations, the physical copying of small amounts of data may be generally less efficient than copying larger amounts of data.

A point in time copy (e.g., FLASHCOPY®) background copy (BGC) algorithm may be designed to optimize disk drive performance by writing 24 or 28 tracks from the control unit cache (depending on a 6+P or 7+P rank width) in a full stride write to the disk array.

To efficiently utilize the resource of a control unit-adapter and disk drive array, the point in time copy background copy (BGC) algorithm may allocate resources to perform as many as 4 full stride write operations (process 96 or 112 tracks) simultaneously. Copy relationships having 64 tracks (e.g., XCOPY®) may not fully utilize the point in time copy background copy (BGC) algorithm. Generally, a greater number of tracks per copy relationship may yield more opportunity for larger (possibly multiple full stride) writes and the associated performance benefit.

Various embodiments of the present disclosure relate to a system for combining accelerated copy (BGC) requests on a VM storage array, through the use of a Wait Accumulation Queue (WAQ). The system may therefore be useful increasing the size and storage location continuity of writes to a VM storage system, and may increase the efficiency and bandwidth of data write operations.

Embodiments of the present disclosure may limit the number of active background copy (BGC) requests, which may be useful in ensuring that BGC requests are efficiently serviced by accelerated copy algorithms. Embodiments of the present disclosure may dynamically combining and reallocating BGC copy requests from a WAQ to a BGC queue, which may be useful in maintaining efficiency of BGC operations.

A system for combining accelerated copy requests implemented according to certain embodiments may be compatible with existing and proven VM storage arrays and other data storage equipment, and may be a useful and cost-effective way to increase efficiency and bandwidth of data copies spanning multiple storage volumes. A system for combining accelerated copy requests implemented according to embodiments of the present disclosure may be installed on an existing VM storage array.

Automated combining of BGC requests from a virtual machine (VM) to a VM storage array may be useful in providing high-speed and high efficiency BGC request execution, and may result in high bandwidth and low latency BGC request processing. A Wait Accumulation Queue (WAQ) may be used as an area in which multiple BGC requests (to adjacent sets of disk tracks) can be staged and combined into larger BGC requests, which may make more efficient use of write control unit adapters. A BGC request created from multiple adjacent BGC requests may result in a write operation to multiple adjacent data storage locations of a storage array (e.g., RAID volume).

Combining multiple BGC requests into larger BGC requests may also reduce control unit adapter overhead, and may help to keep the number of current BGC requests less than a write request limit imposed by a point in time copy algorithm used by the VM storage array. Not exceeding the write request limit may ensure that write requests are processed by the accelerated copy algorithm, which may be faster than other types of copy algorithms.

After BGC requests have been combined in the WAQ, they may be moved from the WAQ to the background copy (BGC) queue, where they may be executed, depending on a set of BGC criteria and the present state (size and growth rate of) the BGC queue. The use of BGC criteria and monitoring of the BGC queue state may result in a system for managing BGC requests to a VM storage array which is both efficient and adaptive in response to changing VM and VM storage array workloads.

Certain embodiments relate to automated combining of BGC requests sent to a virtual machine (VM) storage array. FIG. 1 is a block diagram depiction of a system for executing a method for combining storage array copy (BGC) requests 102 to a VM (disk) storage array 100, including BGC request processing module 104, Wait Accumulation Queue (WAQ) 116, background copy (BGC) queue 118, control unit adapter 120, and disk volumes 122 and 124, according to embodiments of the present disclosure. System 100 may generally be used for increasing the efficiency of data copying operations by combining multiple BGC requests within the WAQ 116, and managing the BGC queue 118 by selectively moving combined BGC requests 102 from the WAQ 116 to the BGC queue 118.

BGC request processing module 104 may include software modules such as BGC request allocate/combine module 106, criteria adjust module 112 and queue monitoring module 114, and data such as BGC criteria 108 and track combining criteria 110. For ease of discussion, the term "software" is used herein, however, it is understood that various embodiments can also be useful with regards to algorithms implemented in firmware or microcode. Instructions comprising such algorithms may be stored in a variety of storage media such as magnetic disks, semiconductor memory (e.g., dynamic random-access memory (DRAM)), or non-volatile (flash) memory devices, and executed by one or more processor circuits.

The combination of software/firmware modules and data may be useful for combining multiple BGC requests into larger (possibly full stride write) BGC requests in the WAQ 116, and for managing the WAQ 116 and the BGC queue 118. Execution of combined BGC requests by control unit adapter 120 may result in efficient copy operations between volume 122 and volume 124. Software modules discussed may be executed by one or more processor circuits in conjunction with a memory device (e.g., DRAM module) in the VM storage array 100. In certain embodiments, volumes 122 and 124 may include multiple disk drives arranged in a striped array, such as a RAID5 or RAID6 configuration.

BGC request allocate/combine module 106 may receive a (first) BGC request 102 from virtualization software (e.g., VMWARE) of a virtual machine. The BGC request 102 may contain parameters that specify the extent of the data to be copied, for example, a source volume, a target volume, and a first and a last track for both source and target data. Module 106 may evaluate the BGC request against a set of (BGC) criteria 108 to determine whether the request should be added to the WAQ 116 or the BGC queue 118. BGC criteria 108 may include the number of BGC relationships in the BGC queue 118, the number of tracks in the current relationship and the number of relationships corresponding to a particular pair of source and target volumes.

WAQ 116 or the BGC queue 118 may be data structures within the VM storage array system accessible to software/firmware modules within BGC request processing module 104. In certain embodiments the WAQ 116 may be created in response to receiving a (first) BGC request 102, and certain embodiments WAQ 116 may already exist when a (first) BGC request 102 is received.

Module 106 may, in response to the BGC criteria 108 being satisfied, add the BGC request to a sorted position in the WAQ 116, and subsequently may combine the BGC request with other (first and second adjacent) BGC requests, to form a (second), possibly full-stride, BGC request, according to track combining criteria 110. Track combining criteria 110 may include sequential source tracks, sequential target tracks, matching source volumes and matching target volumes for BGC requests to be combined. Module 106 may then replace, in a sorted position in the WAQ 116, the (first) BGC request and the (first and second adjacent) BGC requests with the (second) combined BGC request.

Module 106 may evaluate the (second) BGC request to determine if it satisfies a set of (BGC) criteria 108 and if the request should be added to the WAQ 116 or the BGC queue 118. Module 106 may, in response to the BGC criteria 108 not being satisfied, move the (second) combined BGC request to a sorted position in the BGC queue 118.

Combined BGC requests may be executed (by control unit adapter 120) more efficiently than individual BGC requests, and may help to make efficient use of control unit adapter 120 resources, and may be useful in limiting the size of BGC queue 118.

Queue monitoring module 114 may be useful in continuously monitoring the size and growth rate of the WAQ 116 and the BGC queue 118. The criteria adjust module 112 may use the size and growth rates of these queues to dynamically adjust BGC criteria 108, which in turn may determine the number or proportion of BGC requests 102 that are moved to the BGC queue 118. For example, if either the size or growth rate of BGC queue 118 exceeds thresholds determined by criteria adjust module 112, then module 112 may alter BGC criteria 108 to limit the number of BGC requests moved from WAQ 116 to BGC queue 118. Similarly, if both the size or growth rate of BGC queue 118 are less than thresholds determined by criteria adjust module 112, then module 112 may alter BGC criteria 108 to increase the number of BGC requests moved from WAQ 116 to BGC queue 118.

The feedback provided by queue monitoring module 114 and criteria adjust module 112 may be useful, in conjunction with BGC criteria 108 and BGC request allocate/combine module 106 in creating a system that is able to adaptively change the BGC criteria 108 in response to a varying BGC workload, in order to maintain a number of entries in the BGC queue that promotes efficient BGC execution by control unit adapter 120 and overall VM storage array throughput. This dynamic response may be useful in providing robust, efficient data copy performance for the VM storage array over a variety of data storage workloads.

Control unit adapter 120 may include combination of hardware, software and firmware, and may be useful in executing background copy (BGC) operations based upon entries in the BGC queue 118. In certain embodiments, BGC operations may copy data from volume 1 122 to volume 2 124, and in certain embodiments, BGC operations may copy data from volume 2 124 to volume 1 122.

Figure 2:
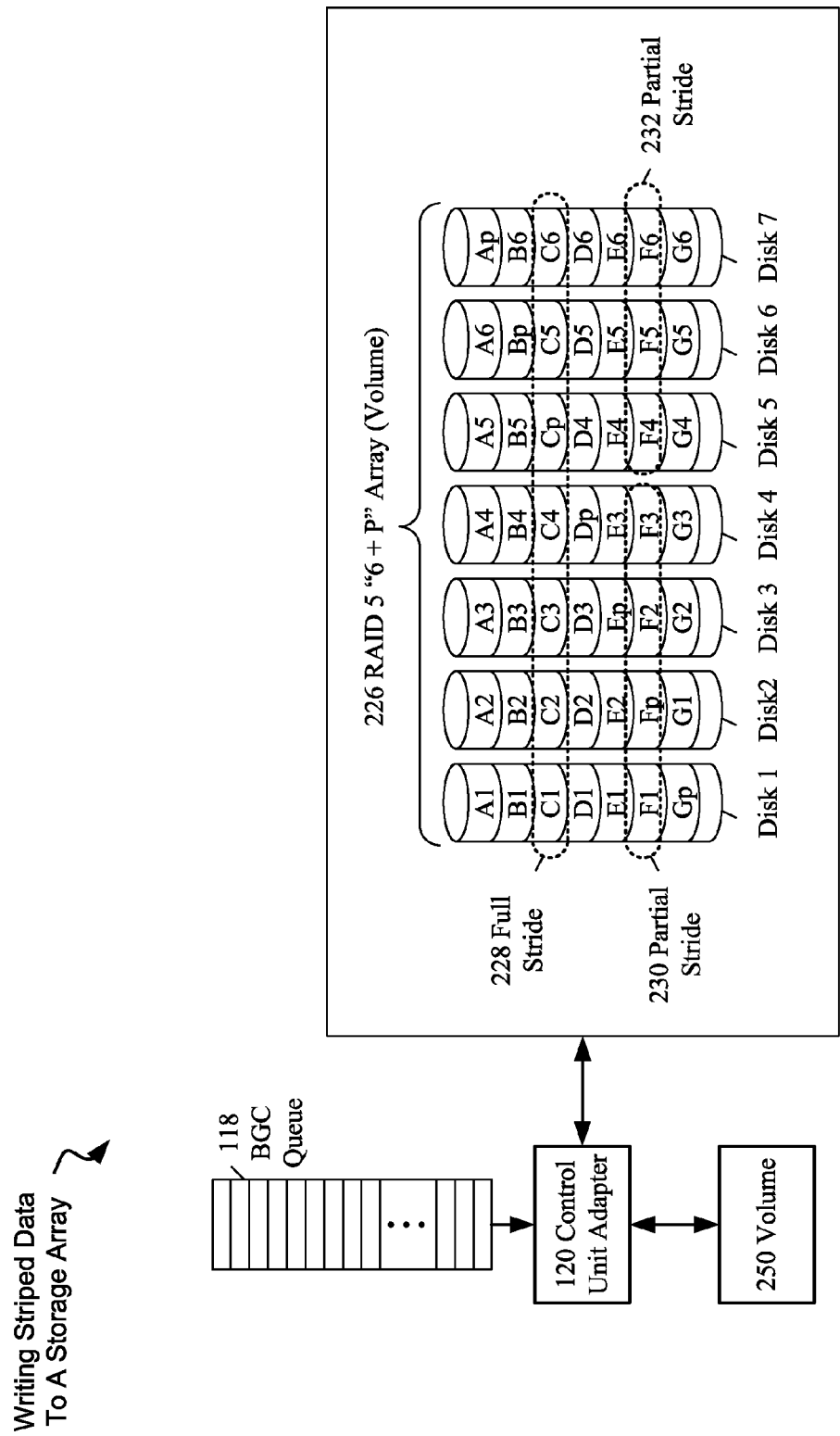
FIG. 2 is a block diagram depicting writing striped data to a storage array, according to embodiments.

FIG. 2 is a block diagram depicting control unit adapter 120 configured to write striped data from storage array volume 250 to a storage array volume 226 in response to a BGC request in BGC queue 118, according to embodiments consistent with FIG. 1.

In certain embodiments, control unit adapter 120 may retrieve a BGC request from BGC queue 118, and may use the information contained within the BGC request (e.g., data extent, starting and ending track numbers and source and target volume IDs) to initiate a copy operation, for example, from volume 250 volume 226. Disk volume 226 may be consistent with either volume 1 122 or volume 2 124 (FIG. 1).

VM storage array volumes may include RAID configurations which may have parity stripes spread across multiple hard drives. For example, volume 226 may be a "6+P" RAID 5 array having "strides" of data+parity that encompass all 7 disks (Disk 1 . . . Disk 7) of volume 226. For example, the full stride 228 may include data stripes C1 . . . C6, and parity stripe $C_P$. Other full strides depicted may also include 6 data stripes in 1 parity stripe. A "partial stride" (e.g. 230 or 232) may include data and/or parity tracks on only a partial subset the disks of volume 226, for example, partial stride write 230 may not include any tracks on Disk 5, Disk 6 or Disk 7.

Prior the execution of a "full stride write" operation, parity calculations may be done on all data stripes included in the stride. For example, data stripes C1 . . . C6 may be included in parity calculations related to full stride 228. Calculated parity may be subsequently stored as parity stripe $C_P$. In the case of a "partial stride write" (e.g., writing partial stride 230 or 232), certain data stripes (e.g., F4, F5 and F6 for partial stride 230) may not be available for the parity calculations, and may be retrieved from volume 226 before calculations can be completed. Retrieval of data and/or parity stripes by control unit adapter 120 may delay the write operation, and cause it to be less efficient than a write operation or all data in parity stripes are immediately accessible to control unit adapter 120, for example, in a local cache memory within adapter 120. The extra time required to retrieve data from the volume and regenerate parity may be known as a "parity regeneration penalty", and in certain embodiments may increase partial stride write times. Combined (possibly full stride) write operations to a striped disk storage array are generally faster and more efficient than partial stride write operations to the same array, according to embodiments.

FIG. 3 includes 2 diagrams depicting a portion of a WAQ before and after BGC relationship request combining, according to embodiments. WAQ before request combining 302 includes data elements of BGC requests in a Wait Accumulation Queue (WAQ) having a sorted order, before BGC requests are combined, according to embodiments. WAQ after request combining 304 includes data elements of BGC requests in a Wait Accumulation Queue (WAQ) having a sorted order, after certain BGC requests are combined. Columns in diagrams 302 and 304 may indicate data fields in each BGC request. For example, the "WAQ Tstamp" field may indicate a WAQ timestamp data field. Rows in diagrams 302 and 304 (e.g., 1A . . . 11A) may correspond to individual BGC requests within the WAQ, according to embodiments. A wait accumulation queue (WAQ) may be useful as a location to aggregate and combine individual BGC requests into BGC requests having a greater number of consecutive tracks.

Referring to diagrams 302 and 304, the columns labeled "Vol Src" may contain source volume names for BGC requests within the diagram, and similarly the columns labeled "Vol Tgt" contains target volume names for BGC requests. The source and target volume names represent the (storage array) volumes that data is copied from and to, respectively, in response to the execution of the BGC request. Source and target volume names are depicted in table 302 as single letters (e.g., "A"), however in certain embodiments volume names may take the form of a numeric value (e.g., "15"), or may have a series of delimited fields (e.g., "vmhbal:C0:T3:L1").

The columns labeled "Source Trk 1st/Lst" in diagrams 302 and 304 may contain first and last track numbers, respectively, corresponding to the source volumes of BGC requests within the diagram, according to embodiments. Similarly, the columns labeled "Target Trk 1st/Lst" in diagrams 302 and 304 contain first and last track numbers, respectively, corresponding to the target volumes of BGC requests within the diagram. Track numbers may be used to define the extent of a BGC request, and may correspond to a physical location on a disk drive or array of disk drives in a data storage system, according to embodiments.

The column labeled "WAQ Tstamp" in diagrams 302 and 304 may contain a WAQ timestamp for each BGC request within the diagram. In certain embodiments, the WAQ timestamp may indicate a creation time of the associated BGC request, and may generally be in a numeric form. The number of digits, time units and/or delimitation of the WAQ timestamp may depend on a precision suitable for software modules processing and comparing WAQ timestamps of BGC requests. A WAQ timestamp may be useful for comparing the (relative) age of multiple BGC requests.

The column labeled "Ext size" in diagrams 302 and 304 may contain a count of the number of tracks included in each BGC request within the WAQ. The number of tracks in each BGC request may be useful to software/firmware modules combining multiple BGC requests to larger (possibly full stride write) BGC requests. The column labeled "# Rel Comb" in diagrams 302 and 304 may contain the number of relationships which have been combined to form each BGC request within the WAQ. A value of "1" in this field may indicate that the BGC request has not been previously combined with another, and a value greater than 1 indicates the number of relationships that have been combined to form the present BGC relationship. Entries in diagrams 302 and 304 having dashes (e.g., "-") may indicate data values which may be present in BGC entries but are not relevant to the discussion herein. A WAQ may include other columns/data fields not depicted in diagrams 302 and 304. Such data fields may include but are not limited to, information useful to a control unit adapter 120 (FIG. 1) in executing BGC request.

Diagram 302 includes rows (e.g., 1A ... 11A), in a sorted order, corresponding to BGC requests within the WAQ. Rows 1A ... 11A may be sorted primarily by source and target volumes, as well as (secondarily) by the first target track for each BGC request. This type of sort arrangement may be useful to software modules, e.g., BGC request allocation/combine module 106 (FIG. 1), which may compare adjacent BGC entries to determine if they satisfy track combining criteria. Track combining criteria may include matching source and target volumes and consecutive track numbers, according to embodiments.

Rows 4A, 5A and 6A depict BGC entries which may satisfy the track combining criteria of having matching source and target volumes ("A" and "C", respectively), and consecutive (first and last) source and target track numbers. For example, row 4A may have a last target track number of 287, and row 5A has a first target track number of 288. Similarly, row 5A may have a last target track number of 315, and row 6A has a first target track number of 316.

Other rows within diagram 302, such as 1A ... 3A, and 7A ... 11A may not satisfy the track combining criteria of matching source and target volumes ("A" and "C", respectively), and consecutive (first and last) source and target track numbers, and may therefore not be eligible to be combined with the BGC requests of rows 4A, 5A and 6A.

Rows 4A, 5A and 6A may each include a WAQ timestamp, indicating the relative age of the BGC entry corresponding to that row. In this example, row 4A contains the timestamp value of "10", which is less than the value contained in rows 5A and 6A, and may indicate that the BGC request and row 4A is the oldest combinable request. The track counter field for rows 4A, 5A and 6A each indicate a BGC request size of 28 tracks, and the number of relationships combined field may be useful in indicating that these 3 requests have each not previously been combined.

A BGC combining operation may be performed by BGC request allocate/combine module 106, which may reference BGC criteria 108 and track combining criteria 110, on the BGC entries in rows 4A, 5A and 6A. Diagram 304 may depict the WAQ following the execution of the BGC combining operation. Row 4B of diagram 304 depicts a combined BGC request which encompasses the source and target tracks (i.e., 160-243, and 260-343, respectively) of the BGC requests depicted in rows 4A, 5A and 6A of diagram 302. The WAQ timestamp of the oldest (row 4A, diagram 302) BGC entry is assigned as the timestamp for the combined (4B of diagram 304) BGC request. The track counts (28) and extent sizes (28) of each of the BGC entries in rows 4A, 5A and 6A are summed up (totaling 84), and used as the entries for the combined BGC entry (4B of diagram 304). The number of relationships combined is updated to 3 in the BGC request 4B of diagram 304. BGC request 4B of diagram 304 has been written into the relative position formerly occupied by BGC request 4A of diagram 302, and BGC requests 5A and 6A have been eliminated from diagram 304. According to embodiments, diagram 304 depicts rows 1B ... 3B and 7B ... 11B as unchanged from their counterparts 1A ... 3A and 7A ... 11A in diagram 302. Operations described in reference to FIG. 3 may be useful in identifying BGC requests which may be combined, and which, when executed as a combined BGC request, may result in efficient use of control unit adapter 120 (FIG. 1) resources.

Figure 4:
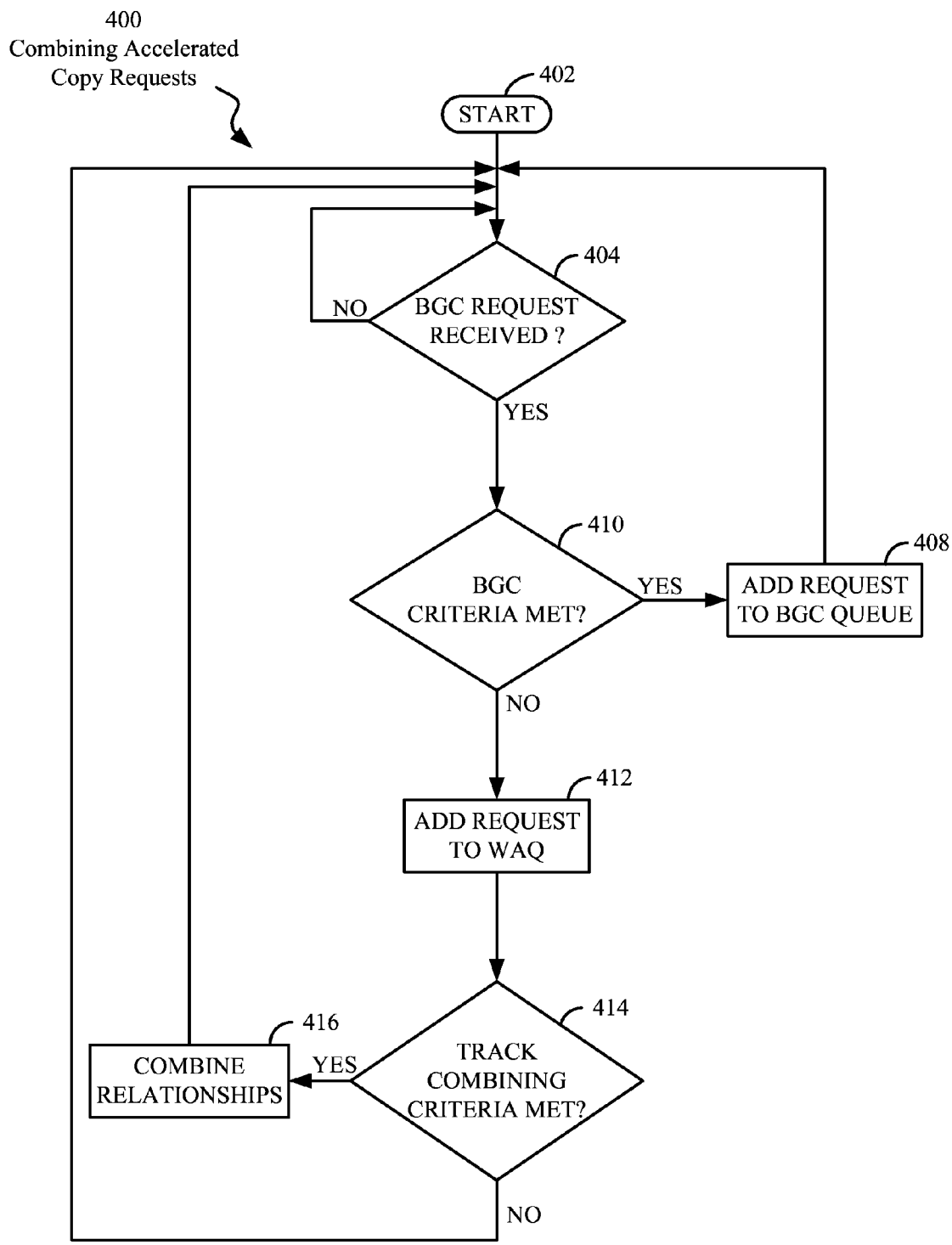
FIG. 4 is a flow diagram illustrating a method for combining accelerated copy requests, according to embodiments.

FIG. 4 is a flow diagram, consistent with the figures, illustrating a method for combining accelerated copy requests, according to embodiments. In certain embodiments, accelerated copy requests may include FLASH-COPY requests. The process 400 moves from start 402 to decision 404. Operation 404 generally refers to waiting for a background copy (BGC) request 102 (FIG. 1) to be received from a virtual machine (VM). The BGC request 102 (FIG. 1) may be received by a system for combining BGC requests, which may be hosted on a VM storage array. The BGC request may include information regarding a requested copy relationship including source and target volume names/numbers, extent information, and first and last track numbers. A BGC request may be sent by a VM to offload a storage operation to the VM storage array. Once a BGC request 102 (FIG. 1) is received from a VM, the process moves to decision 410.

At decision 410, a determination is made regarding the BGC request 102 (FIG. 1) received in operation 404. The BGC request may be evaluated against a background copy (BGC) criteria such as a request count threshold, a track count threshold in the volume request threshold. BGC criteria may be set and adjusted (e.g., the criteria adjust module 112, FIG. 1) to promote efficient use of control unit adapter 120 (FIG. 1), by favoring combined write operations by the control unit adapter. If a BGC request includes data/parity locations (or stripes) on all disks in the target storage array (e.g., 228, FIG. 2), then it may require fewer read/write operations to complete than individual write operations. Parity for a combined write may be generated without retrieval of data from the VM storage array, which may result in greater write operation efficiency and may limit BGC queue size. If the BGC request satisfies the BGC criteria, the process moves to operation 408. If the BGC request does not meet the BGC criteria, the process moves to operation 412.

Operation 408 generally refers to adding a background copy (BGC) request to the BGC queue (118, FIG. 1). Once the BGC request is added to the BGC queue (118, FIG. 1), it may be executed by the control unit adapter (120, FIG. 1), which may copy data corresponding to the request from a storage volume (e.g., 122 or 124, FIG. 1) to another volume.

Once the BGC request is added to the BGC queue, the process 400 returns to operation 404.

Operation 412 generally refers to adding the received BGC request (102, FIG. 1) to the WAQ 116 (FIG. 1). The WAQ may be useful as a location to gather and combine BGC requests into combined write requests that may result in efficient write operations to the storage array volumes (122, 124, FIG. 1). BGC requests may be added to the WAQ in a sorted position, to enable comparison and possible combination with adjacent BGC requests. If the BGC request is new to the WAQ, a timestamp may be added to the request. If the BGC request has been on the WAQ previously, the prior timestamp may be retained with the request. Once the received BGC request is added to the WAQ, the process moves to decision 414.

At decision 414, a determination is made regarding the BGC request (added to the WAQ (116, FIG. 1) in operation 412) and one or more adjacent BGC requests meeting track combining criteria. Track combining criteria may include matching source and target volume IDs for multiple adjacent BGC requests, sequential source tracks, and sequential target tracks for both relationships. If the BGC request meets track combining criteria, the process moves to operation 416. If the BGC request does not meet track combining criteria, the process returns to decision 404.

Operation 416 generally refers to combining BGC relationships within the WAQ. BGC requests having adjacent tracks, and matched source and target volumes may be combined within the WAQ. A new, combined BGC request may replace 2 or more combined relationships in the WAQ, in a sorted position. Once the BGC requests are combined within the WAQ, the process returns to decision 404.

Figure 5:
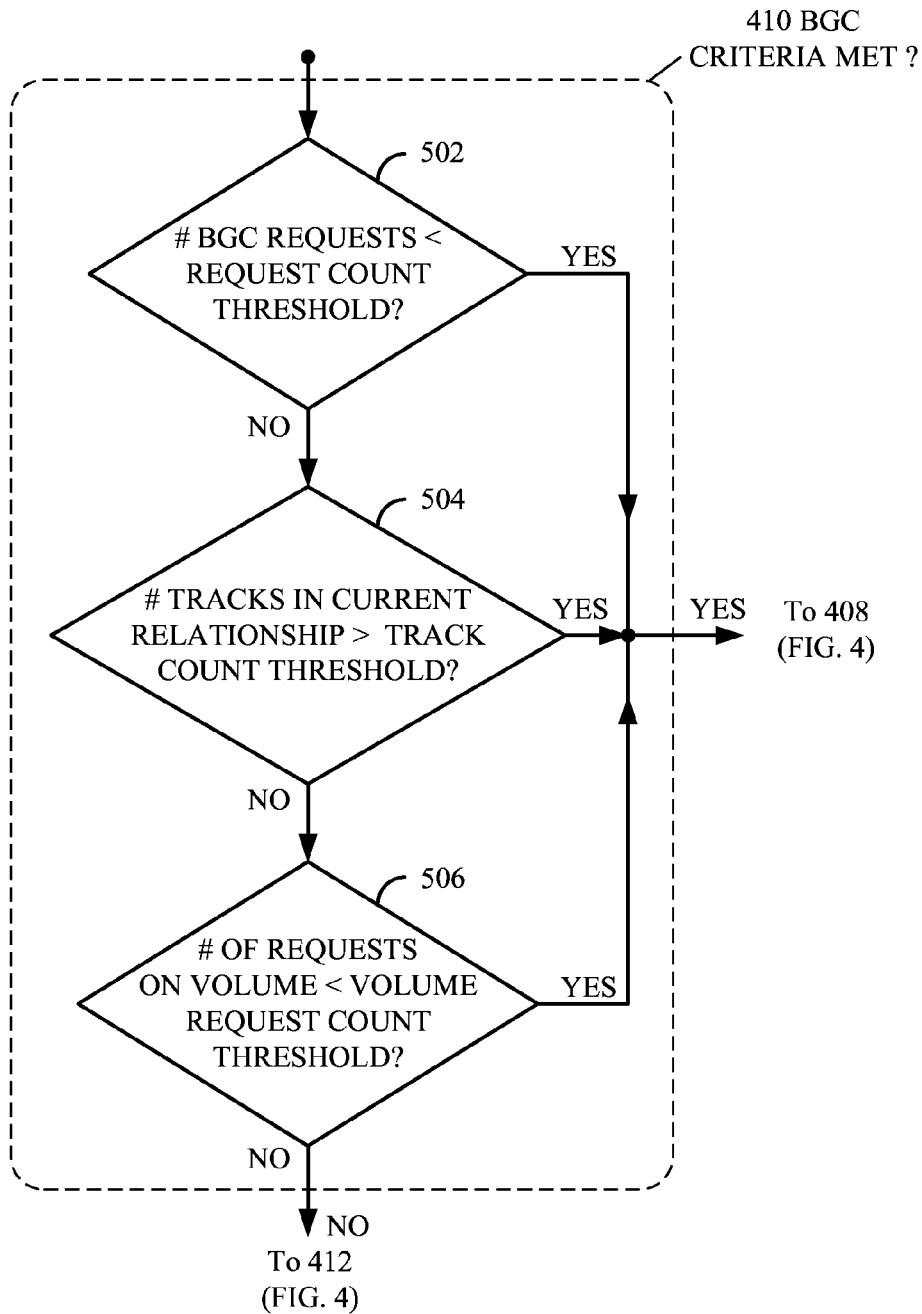
FIG. 5 is a flow diagram illustrating a method for evaluating BGC requests against a background copy (BGC) criteria, according to embodiments.

FIG. 5 is a flow diagram, consistent with operation 410 (FIG. 4), illustrating a method for evaluating a BGC request against background copy (BGC) criteria, according to embodiments. A BGC request may be evaluated against 3 criteria (in decisions 502, 504 and 506), which may determine if the request may make efficient use of background copy (BGC) resources, and accordingly be added to a BGC queue, or if the request should be added to a WAQ, where it may be combined with existing or subsequent BGC requests. The 3 criteria may be stored in BGC criteria 108 (FIG. 1), and may be dynamically modified by the criteria adjust 112 (FIG. 1) module, in response to the state of the WAQ 116 (FIG. 1) and the BGC queue 118 (FIG. 1), as monitored by the queue monitoring 114 (FIG. 1) module.

The process 500 starts at decision 502. At decision 502, a comparison is made between a current number of BGC requests in the BGC queue and a request count threshold, which may be stored in BGC criteria 108 (FIG. 1). The request count threshold may be used as an indicator of performance threshold for the BGC queue. For example, if the current number of BGC requests (e.g. 45) is greater than the request count threshold (e.g. 30), that may indicate that the BGC queue is getting backed up, and may not perform efficiently, and that more BGC request combining may be needed to reduce the number of BGC requests in the BGC queue. If the current number of BGC requests (e.g. 10) is less than the request count threshold (e.g. 30), that may indicate that the BGC queue is relatively free, and performing efficiently, and that less BGC request combining may be still allow the BGC queue to perform acceptably. If the number of BGC requests in the BGC queue is less than the request count threshold, the process moves to operation 408 (FIG. 4), otherwise the process moves to decision 504.

At decision 504, a comparison is made between a number of tracks in the current BGC request and a track count threshold, which may be stored in BGC criteria 108 (FIG. 1). Generally, if the number of tracks per BGC relationship request is equal to or greater than the number of tracks required for a combined or possibly full stride write (28, per the example of FIG. 2), and the tracks line up with stride boundaries, the control unit adapter 120 (FIG. 1) may respond by executing a combined write, which may be more efficient than (one or more) individual writes. Increased efficiency may be realized by performing multiple combined writes (e.g., 2 full stride writes may include 56 tracks, per the example of FIG. 2). The track count threshold may be set and/or dynamically adjusted to favor a particular "target" minimum number of consecutive tracks to be written to achieve a desired performance level. If the number of tracks in the current BGC request is greater than the track count threshold, the process moves to operation 408 (FIG. 4), otherwise the process moves to decision 506.

At decision 506, a comparison is made between a number of BGC requests having the same volume (source and target) pairings and a volume request count threshold, which may be stored in BGC criteria 108 (FIG. 1). The number of BGC requests having the same volume pairings may be an indicator of the likelihood of finding adjacent, combinable BGC requests for a particular volume (source/target) pair. For example, if the number of same volume BGC requests is low, the likelihood of finding combinable BGC requests may also be low. The volume request count threshold may be useful as a comparison metric useful in deciding if finding combinable BGC requests for a particular volume pair is relatively likely or unlikely. If the number of BGC requests having the same volume (source and target) pairings is less than the volume request count threshold, the process moves to operation 408 (FIG. 4), otherwise the process moves to operation 412 (FIG. 4).

The criteria discussed above can be changed to accommodate a variety of BGC queue sizes and growth rates, as may be influenced by BGC workload conditions, to produce a flexible and adaptable system which may have a robust, efficient performance over a variety of BGC workloads.

Figure 6:
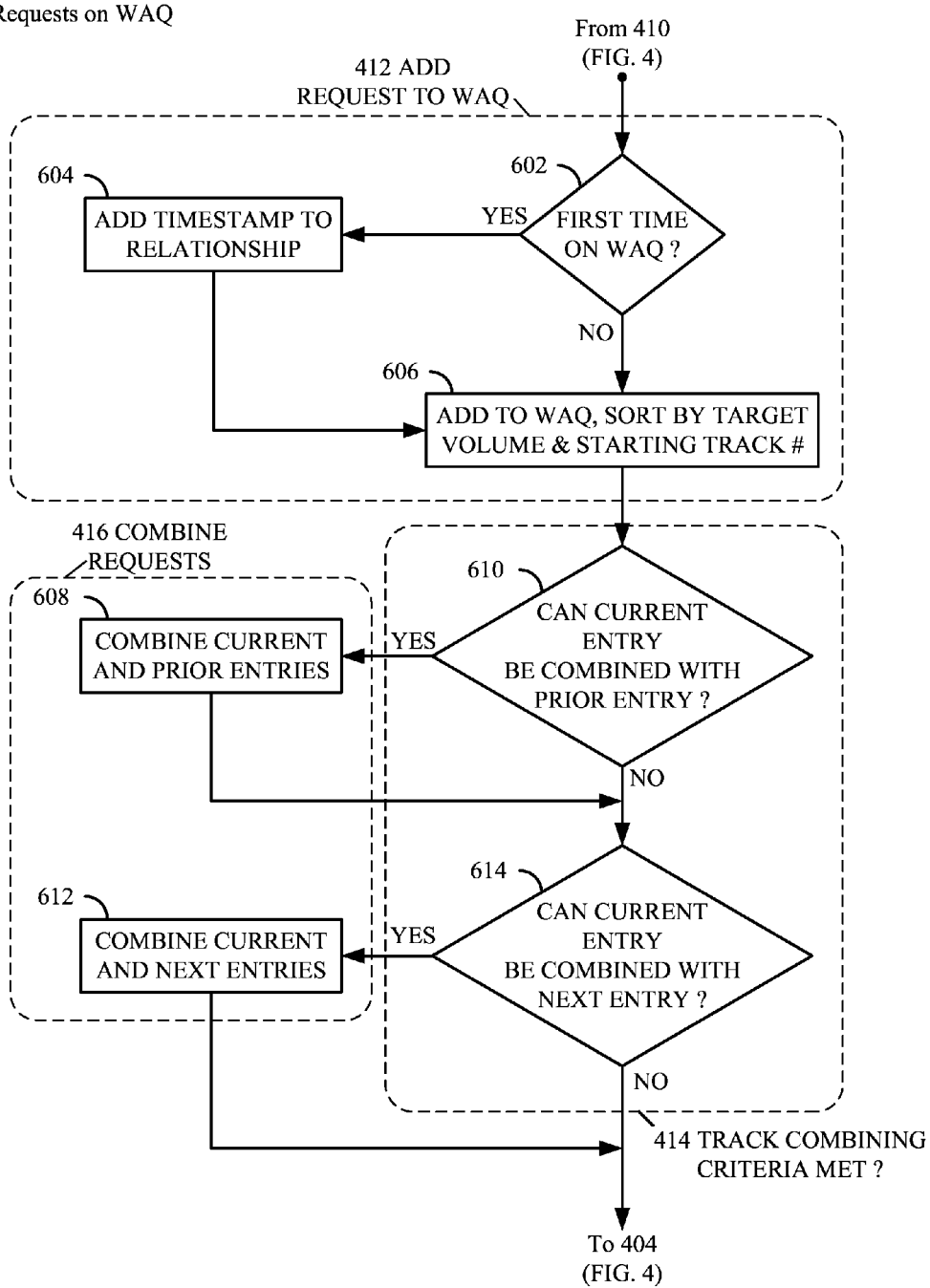
FIG. 6 is a flow diagram illustrating a method for queuing and combining BGC requests on a WAQ, according to embodiments.

FIG. 6 is a flow diagram, consistent with operations 412, 414 and 416 (FIG. 4), illustrating a method for queuing and combining BGC requests on a WAQ, according to embodiments. The process 600 starts at decision 602. At step 602, a determination is made if a received BGC request is new to the WAQ. The determination may be made, for example, by examining BGC relationship for the presence of a timestamp. If a timestamp is not attached to the BGC relationship, BGC request may be new. If the BGC request is new to the WAQ, the process moves to operation 604. If the BGC request is not new to the WAQ, the process moves to operation 606.

Operation 604 generally refers to adding a timestamp to a background copy (BGC) relationship request from a VM. It timestamp may indicate a time of creation of the BGC relationship request, and may be useful in determining the relative age of two or more BGC requests. The relative value of a timestamp may be useful in deciding if a BGC request should be transferred to a BGC queue. Once the timestamp is added to the request, the process moves to operation 606.

Operation 606 generally refers to adding the received BGC request to the WAQ 116 (FIG. 1), sorting the WAQ by a target volume and the BGC request starting track number. Sorted BGC requests within the WAQ may be useful in facilitating the comparing of adjacent BGC request tracks and compatible volumes for BGC relationship combining. Once the BGC request has been added to the WAQ, and the WAQ has been sorted, the process moves to decision 610.

At step 610, a determination regarding made regarding combining the current BGC request with an adjacent prior BGC request in the WAQ. If the prior BGC relationship has matching source and target volume IDs, sequential source tracks and sequential target tracks with the current relationship, then the current BGC requests can be combined with the prior request. If the current BGC request can be combined with an adjacent prior BGC request in the WAQ, the process moves to operation 608. If the current BGC request cannot be combined with an adjacent prior BGC request in the WAQ, the process moves to decision 614.

Operation 608 generally refers to combining the current BGC request with adjacent prior BGC request in the WAQ. Combining a current BGC request with a prior BGC request may include combining track numbers, extent sizes, assigning the timestamp value of the oldest timestamp of 2 requests to the new requests, and replacing the obsolete (old) request with a new combined request the WAQ. Once the current BGC request is combined with adjacent prior BGC request in the WAQ, the process moves to operation 614.

At step 614, a determination is regarding combining the current BGC request with an adjacent next BGC request in the WAQ. If the next BGC relationship has matching source and target volume IDs, sequential source tracks and sequential target tracks with the current relationship, then the current BGC requests can be combined with the next request. If the current BGC request can be combined with an adjacent next BGC request in the WAQ, the process moves to operation 612. If the current BGC request cannot be combined with an adjacent prior BGC request in the WAQ, the process moves to operation 404 (FIG. 4).

Operation 612 generally refers to combining the current BGC request with adjacent next BGC request in the WAQ. Combining a current BGC request with a next BGC request may include combining track numbers, extent sizes, assigning the timestamp value of the oldest timestamp of 2 requests to the new requests, and replacing the obsolete (old) request with a new combined request the WAQ. Once the current BGC request is combined with adjacent next BGC request in the WAQ, the process moves to operation 404 (FIG. 4).

Figure 7:
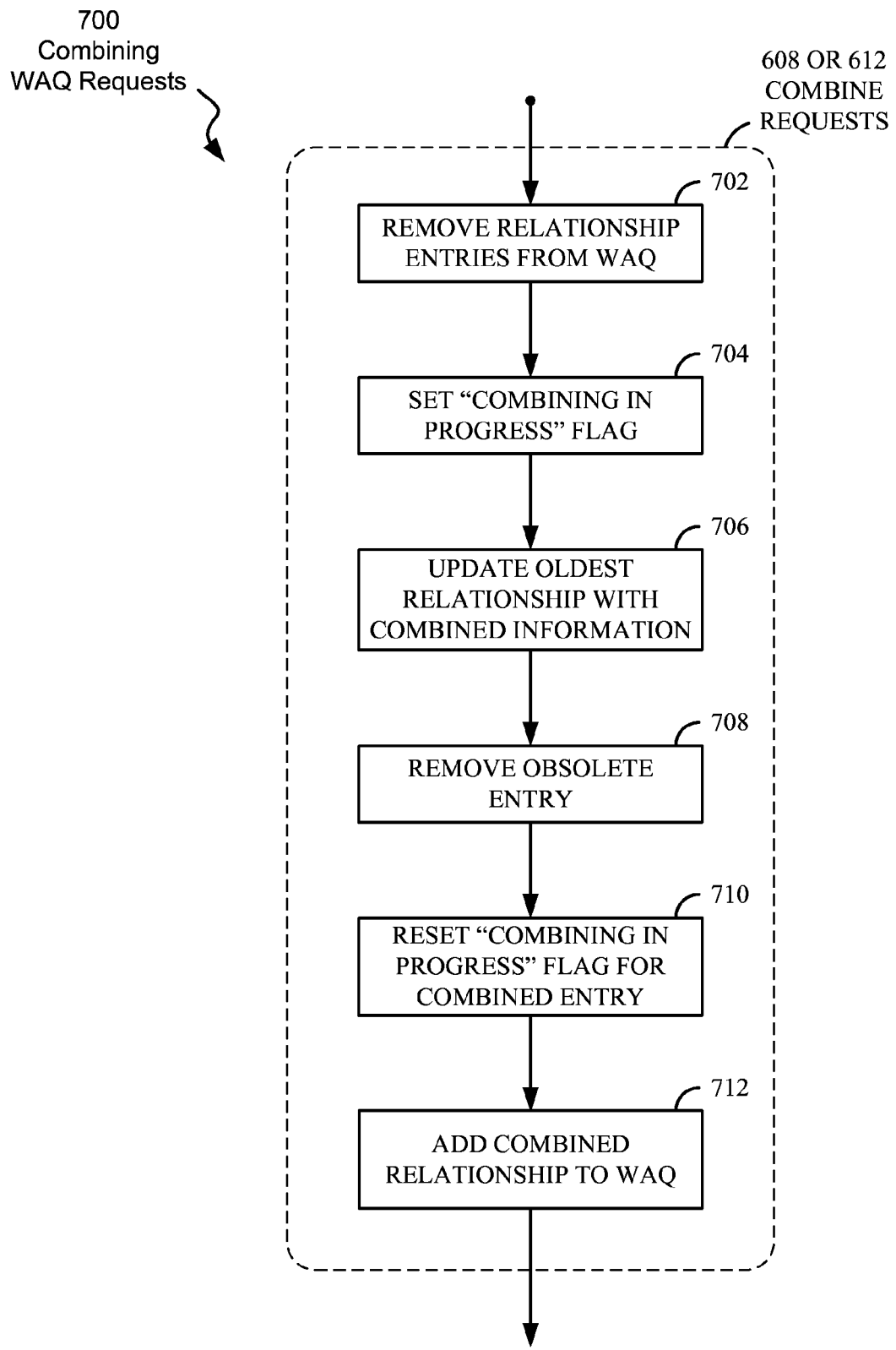
FIG. 7 is a flow diagram illustrating a method for combining WAQ requests, according to embodiments.

FIG. 7 is a flow diagram, consistent with operations 608 and 612 (FIG. 6), illustrating a method for combining WAQ requests, according to embodiments. The process 700 starts at operation 702. Operation 702 generally refers to removing (BGC) relationship entries from the WAQ. BGC relationship entries that are being combined will be obsolete, and replaced by a combined entry once process 700 complete, and therefore do not need to remain in the WAQ. Once relationship entries are removed from the WAQ, the process moves to operation 704.

Operation 704 generally refers to setting a "Combining In Progress" (CIP) flag. The CIP flag may serve as an indicator that may cause software/firmware modules to not modify BGC relationships in the process of being combined. Once the combining in progress flag has been set, the process moves to operation 706.

Operation 706 generally refers to updating the oldest BGC relationship with merged information from the BGC relationships being combined. BGC relationship data updated during operation 706 may include a starting source and target track numbers, a size of the new data extent, a lowest (oldest) generation number, a lowest (oldest) relation ID, a track counter, a timestamp, a combined relationship indicator, and a number of combined entries (included in the new entry). The track counter may be updated to reflect the sum of the track counters for each of the relationships being combined. Updated BGC relationship data may be useful to a software determining which queue (BGC or WAQ) to allocate the BGC request to, and may also be useful to the control unit adapter 120 (FIG. 1) in executing the BGC request. Once the oldest relationship has been updated, the process moves to operation 708.

Operation 708 generally refers removing obsolete entry information from processor memory and other data/metadata locations. Removing traces of BGC/FLASHCOPY relationships from other locations where they may exist (besides the WAQ) may prevent processor and control unit adapter actions on BGC relationships which have been combined. Once the obsolete entry has been removed from the WAQ, the process moves to operation 710.

Operation 710 generally refers to resetting the "combining in progress" (CIP) flag. Resetting the CIP flag may serve as an indicator that may allow software/firmware modules interact with BGC relationships that are no longer in the process of being combined. Once the CIP flag has been reset, the process moves to operation 712.

Operation 712 generally refers to adding a combined relationship (formed in operation 706) to the WAQ. The combined relationship may include two or more write relationships having adjacent tracks, and may be placed in the WAQ in a sorted position, based on source and target volume pairings and track ordering. Once the combined relationship has been added to the WAQ, if the process 700 is consistent with operation 608, process 700 moves to decision 614. If the process 700 is consistent with operation 612, process 700 moves to operation 404 (FIG. 4).

Figure 8:
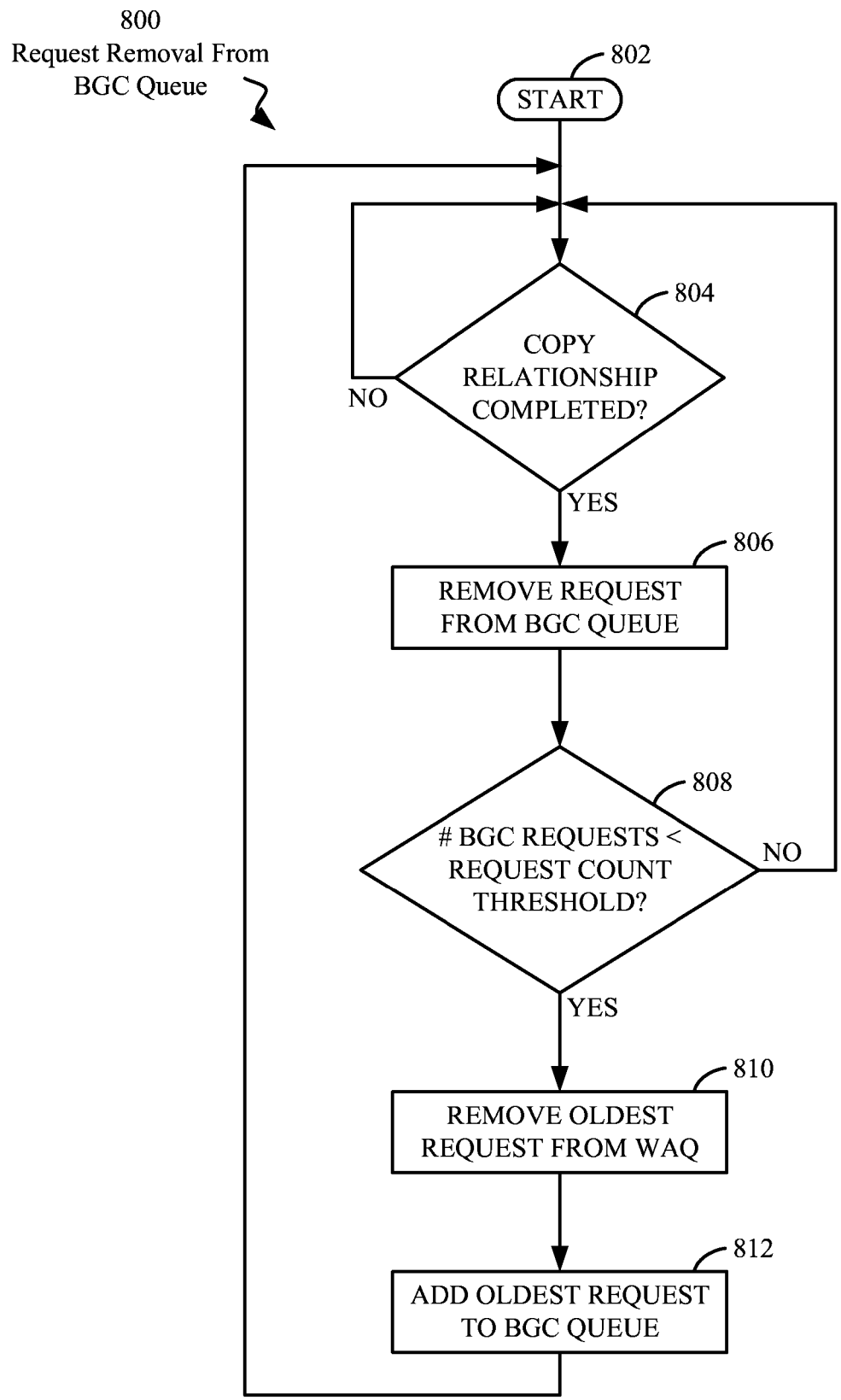
FIG. 8 is a flow diagram, consistent with the figures, illustrating a method for removing write relationship requests from a BGC queue, according to embodiments.

FIG. 8 is a flow diagram, consistent with the figures, illustrating a method for removing write relationship requests from a BGC queue, according to embodiments. The method may be useful for orderly and efficient BGC queue management by adding BGC requests to the BGC queue based on a request count threshold. The method may be useful in dynamically managing the BGC queue size for efficient control unit adapter 120 (FIG. 1) performance.

The process 800 moves from start 802 to decision 804. Operation 804 generally refers to the process waiting for a background copy (BGC) request 102 (FIG. 1) to be executed, which may result in the completion of a copy relationship. BGC requests may be retrieved individually from a BGC queue 118 (FIG. 1), and executed by a control unit adapter 120 (FIG. 1). The BGC request may include information regarding a requested copy relationship including source and target volume names/numbers, extent information, and first and last track numbers. Once a BGC request is retrieved from the BGC queue 118 (FIG. 1) and executed (the copy relationship is completed), the process moves to operation 806.

Operation 806 generally refers to removing the BGC request from the BGC queue 118 (FIG. 1). Once the BGC request has been executed (operation 804), it may not be necessary to retain it in the BGC queue 118 (FIG. 1). Once the received BGC request has been removed from the BGC queue, the process moves to decision 808.

At decision 808, a comparison is made between a current number of BGC requests in the BGC queue and a request count threshold, which may be stored in BGC criteria 108 (FIG. 1). The request count threshold may be used as an indicator of performance threshold for the BGC queue. For example, if the current number of BGC requests (e.g. 45) is greater than the request count threshold (e.g. 30), that may indicate that the BGC queue is getting backed up, and may not perform efficiently, and that fewer BGC requests may need to be added to the BGC queue to keep it running efficiently. If the current number of BGC requests (e.g. 10) is less than the request count threshold (e.g. 30), that may indicate that the BGC queue is relatively free, and performing efficiently, and that adding BGC requests to the BGC queue may still allow it to perform with acceptable efficiency. If the number of BGC requests in the BGC queue is less than the request count threshold, the process moves to operation 810, otherwise the process returns to decision 804.

Operation 810 generally refers to removing the oldest BGC request from the WAQ 116 (FIG. 1). The oldest BGC request in the WAQ may be chosen and removed from the WAQ to reduce the overall latency involved in processing write requests. The (relative) age of BGC requests in the WAQ may be determined by a field in the BGC request, such as the WAQ timestamp (FIG. 3). Once the oldest request is removed from the WAQ, the process moves to operation 812.

Operation 812 generally refers to adding the oldest BGC request (removed from the WAQ 116 (FIG. 1) in operation 810) to the BGC queue 118 (FIG. 1). The oldest BGC request may be added to the BGC queue in a sorted order, and may be executed by control unit adapter 120 according to the sorted (timestamp) order. Once the oldest BGC request is added to the WAQ 116 (FIG. 1), the process returns to operation 804.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
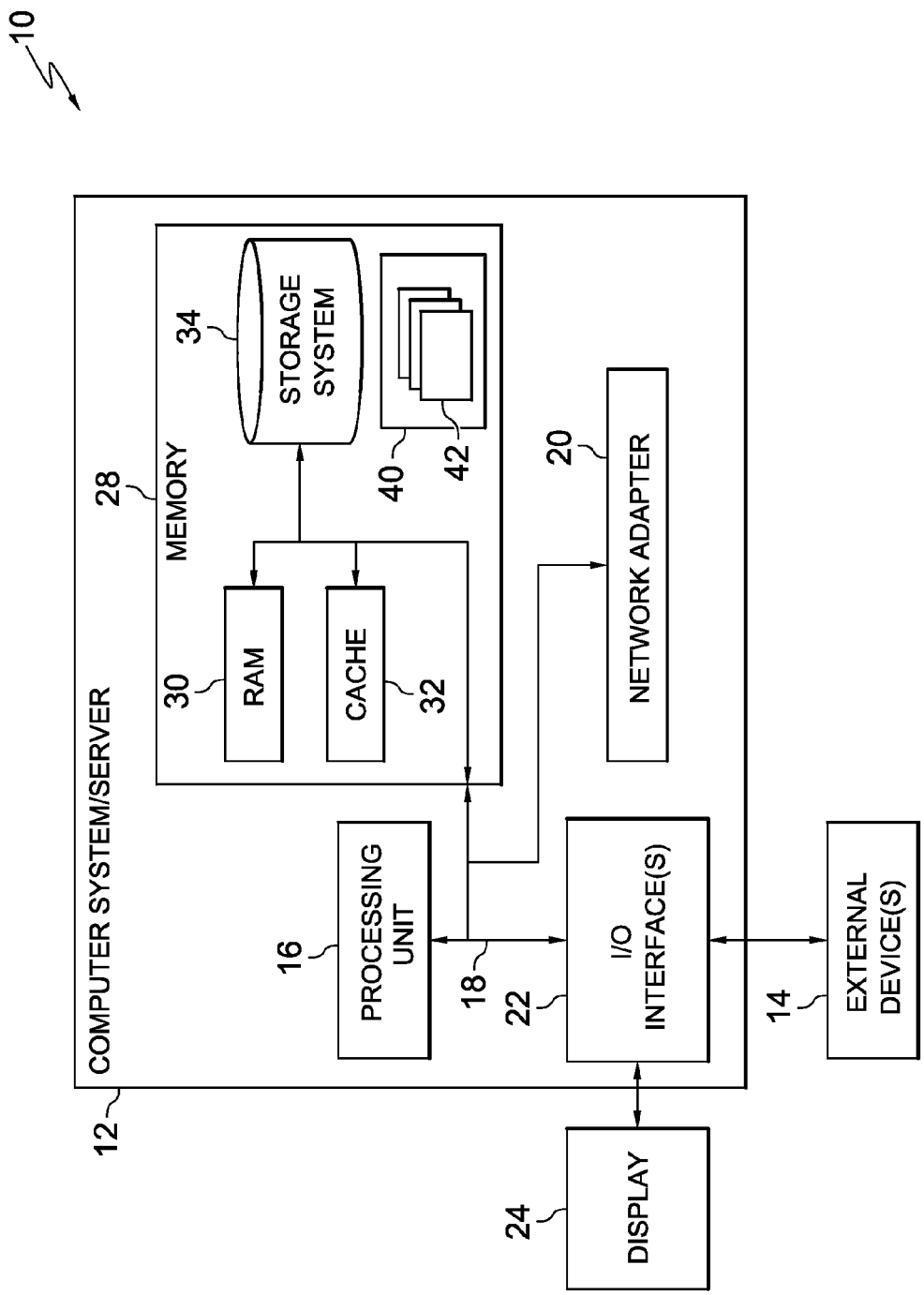
FIG. 9 depicts a cloud computing node, according to an embodiments of the present disclosure.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
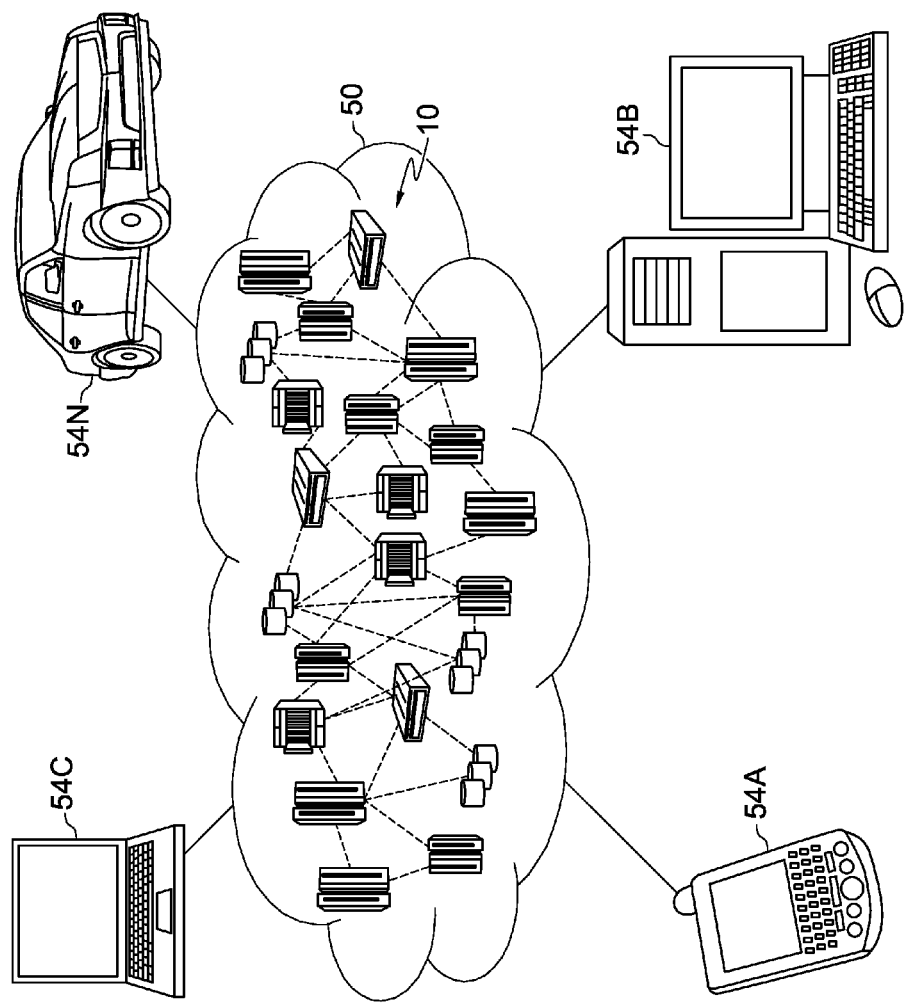
FIG. 10 depicts a cloud computing environment, according to embodiments of the present disclosure.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
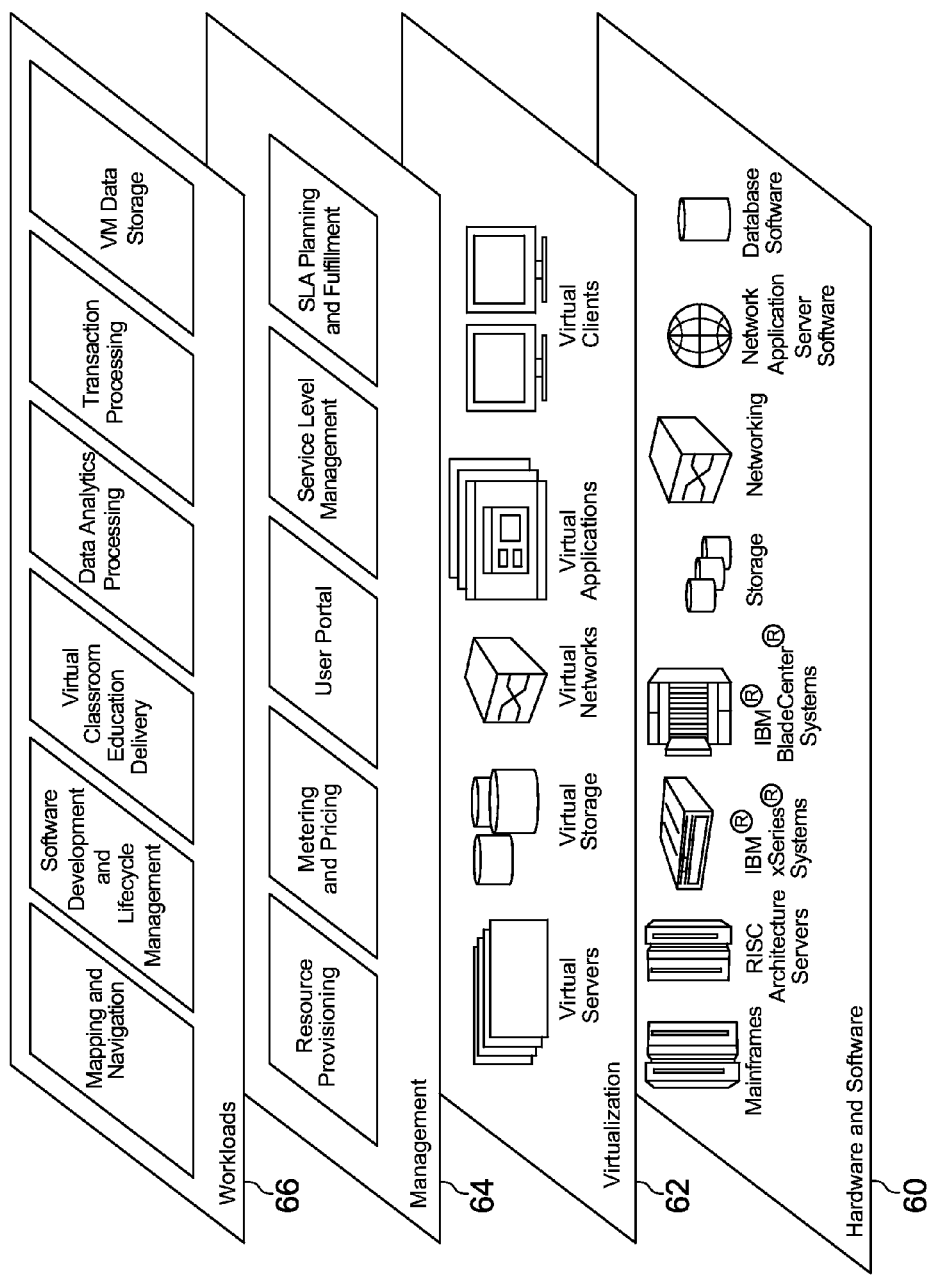
FIG. 11 depicts abstraction model layers, according to embodiments of the present disclosure.

Referring now to FIG. 11, a set of functional abstraction layers provided by cloud computing environment 50 (FIG. 8) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and VM data storage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for combining storage array copy requests for a disk storage system, the method comprising:
    receiving a first BGC (background copy) request;
    determining that the first BGC request satisfies a set of background copy (BGC) criteria that at least includes a number of BGC relationships in a BGC queue, a number of BGC relationships corresponding to a source volume and a target volume, and a number of tracks in a current BGC relationship;
    adding, based on the determining, the first BGC request to a sorted position in a wait accumulation queue (WAQ);
    combining, based on comparing a set of track combining data to a set of track combining criteria that at least includes, corresponding to BGC requests to be combined, sequential source tracks, sequential target tracks, a matching source volume and a matching target volume, the first BGC request and a first adjacent BGC request, selected from a plurality of BGC requests in the BGC queue, into a second BGC request, the second BGC request including data locations corresponding to the first BGC request and data locations corresponding to the first adjacent BGC request;
    replacing, in a sorted position in the WAQ, the first BGC request and the first adjacent BGC request with the second BGC request; and
    moving, based on the set of BGC criteria, the second BGC request to the BGC queue.

2. The method of claim 1, further comprising appending a first timestamp to the first BGC request and appending a second timestamp to the second BGC request, and moving, based upon the first timestamp and the second timestamp, a BGC request from the WAQ to the BGC queue.

3. The method of claim 1, further comprising monitoring a size of the BGC queue and a growth rate of the BGC queue.

4. The method of claim 3, further comprising dynamically adjusting the set of BGC criteria based on the size of the BGC queue.

5. The method of claim 3, further comprising dynamically adjusting the set of BGC criteria based on the growth rate of the BGC queue.

6. The method of claim 1, wherein the set of BGC criteria includes at least one member of a group consisting of: a BGC queue request count threshold, a relationship track count threshold, and a volume request count threshold.

7. The method of claim 1, further comprising monitoring a set of track combining data including:
    a first BGC request source volume;
    a first adjacent BGC request source volume;
    a first BGC request target volume;
    a first adjacent BGC request target volume;
    a first and a last BGC request source track;
    a first and a last adjacent BGC request source track;
    a first and a last BGC request target track; and
    a first and a last adjacent BGC request target track.

8. The method of claim 1, further comprising combining, based on comparing a set of track combining data to a set of track combining criteria, a second adjacent BGC request into the second BGC request, the second BGC request including data locations corresponding to the second adjacent BGC request.

9. An electronic system for combining storage array copy requests for a disk storage system, the electronic system comprising:
    a multi-volume disk storage system;
    a control unit adapter;
    a memory device; and
    one or more processor circuits configured to:
        receive a first BGC (background copy) request;
        determine that the first BGC request satisfies a set of background copy (BGC) criteria that at least includes a number of BGC relationships in a BGC queue, a number of BGC relationships corresponding to a source volume and a target volume, and a number of tracks in a current BGC relationship;
        add, based on the determining, the first BGC request to a sorted position in a wait accumulation queue (WAQ);
        combine, based on comparing a set of track combining data to a set of track combining criteria that at least includes, corresponding to BGC requests to be combined, sequential source tracks, sequential target tracks, a matching source volume and a matching target volume, the first BGC request and a first adjacent BGC request, selected from a plurality of BGC requests in the BGC queue, into a second BGC request, the second BGC request including data locations corresponding to the first BGC request and data locations corresponding to the first adjacent BGC request;

replace, in a sorted position in the WAQ, the first BGC request and the first adjacent BGC request with the second BGC request; and move, based on the set of BGC criteria, the second BGC request to the BGC queue.

10. The electronic system of claim 9, wherein the one or more processor circuits are further configured to monitor a set of track combining data including:
a first BGC request source volume;
a first adjacent BGC request source volume;
a first BGC request target volume;
a first adjacent BGC request target volume;
a first and a last BGC request source track;
a first and a last adjacent BGC request source track;
a first and a last BGC request target track; and
a first and a last adjacent BGC request target track.

11. The electronic system of claim 9, wherein the one or more processor circuits are further configured to combine, based on comparing a set of track combining data to a set of track combining criteria, a second adjacent BGC request into the second BGC request, the second BGC request including data locations corresponding to the second adjacent BGC request.

12. A computer program product for combining storage array copy requests for a disk storage system, the computer program product comprising:
a computer readable storage medium having stored thereon:
program instructions executable by one or more processor circuits to cause the one or more processor circuits to:
receive a first BGC (background copy) request;
determine that the first BGC request satisfies a set of background copy (BGC) criteria that at least includes a number of BGC relationships in a BGC queue, a number of BGC relationships corresponding to a source volume and a target volume, and a number of tracks in a current BGC relationship;
add, based on the determining, the first BGC request to a sorted position in a wait accumulation queue (WAQ);
combine, based on comparing a set of track combining data to a set of track combining criteria that at least includes, corresponding to BGC requests to be combined, sequential source tracks, sequential target tracks, a matching source volume and a matching target volume, the first BGC request and a first adjacent BGC request, selected from a plurality of BGC requests in the BGC queue, into a second BGC request, the second BGC request including data locations corresponding to the first BGC request and data locations corresponding to the first adjacent BGC request;
replace, in a sorted position in the WAQ, the first BGC request and the first adjacent BGC request with the second BGC request; and
move, based on the set of BGC criteria, the second BGC request to the BGC queue.

13. The computer program product of claim 12, wherein the program instructions are executable to further cause the one or more processor circuits to append a first timestamp to the first BGC request and append a second timestamp to the second BGC request, and move, based upon the first timestamp and the second timestamp, a BGC request from the WAQ to the BGC queue.

14. The computer program product of claim 12, wherein the program instructions are executable to further cause the one or more processor circuits to monitor a size of the BGC queue and a growth rate of the BGC queue.

15. The computer program product of claim 12 wherein the program instructions are executable to further cause the one or more processor circuits to dynamically adjust the set of BGC criteria based on a size of the BGC queue.

16. The computer program product of claim 12, wherein the program instructions are executable to further cause the one or more processor circuits to dynamically adjust the set of BGC criteria based on a growth rate of the BGC queue.

17. The computer program product of claim 12, wherein the set of BGC criteria includes at least one member of a group consisting of: a BGC queue request count threshold, a relationship track count threshold, and a volume request count threshold.

* * * * *